United States Patent Office 3,153,055
Patented Oct. 13, 1964

3,153,055
PROCESS FOR SEPARATING TOCOPHEROLS AND STEROLS FROM DEODORIZER SLUDGE AND THE LIKE
Winton Brown and Frank E. Smith, Rochester, N.Y., assignors to Eastman Kodak Company, Rochester, N.Y., a corporation of New Jersey
No Drawing. Filed Mar. 20, 1962, Ser. No. 181,157
5 Claims. (Cl. 260—345.6)

This invention relates to the chemical arts. More particularly, it relates to sterols and tocopherols and the separation of these compounds from deodorizer sludge and the like.

Tocopherols and sterols are complex alcohols of well-known utilities. α-Tocopherol and its esters are employed in vitamin preparations because of their vitamin E activity whereas the non-α-tocopherols are useful as antioxidants and as intermediates for making α-tocopherol. The sterols are useful as raw materials in the preparation and synthesis of adrenal cortical and sex hormones.

Tocopherols and sterols occur in natural fats and oils and particularly in vegetable oils. When such fats and oils are subjected to deodorization treatment in a conventional deodorizer, that is, blown under vacuum with an inert gas such as steam, nitrogen and the like, a material is removed therefrom by the gas. This material is usually separated from the gas in traps, condensers and the like as a by-product sludge. This by-product sludge is commonly referred to as deodorizer sludge. It is also termed deodorizer distillate, hot well scum, lighter-than-water scum, clabber stock, condenser oil, deodorizer trap oil, catch basin scum and the like. Invariably the tocopherols and sterols initially in the oil or fat being deodorized are found to be concentrated in this deodorizer sludge. However, the concentrations of the tocopherols and sterols are quite low. For example, a typical total tocopherols concentration is one generally in a range from about 1 to about 12% by weight.

Deodorizer sludge is a very complex mixture. In addition to tocopherols and sterols there are usually present in the sludge at substantial concentrations higher fatty acid esters of sterols, mixed, higher fatty acid glycerides (triglycerides, diglycerides and monoglycerides), free, higher fatty acids, hydrocarbons and other materials. For pharmaceutical and other uses concentrates of tocopherols and sterols must have high purities. Consequently, for these uses it is necessary to separate tocopherols and sterols from other components of deodorizer sludge.

This has led to the development of a number of processes for the treatment of deodorizer sludge to separate therefrom concentrates of tocopherols and sterols of high purities. However, while some of these processes have been commercially acceptable, none have been completely satisfactory for a number of reasons. For instance, some processes involve admixing large quantities of alkali and the like with the sludge in order to hydrolyze and saponify the esters that are present. These quantities are stoichiometrically in great excess in order to obtain maximum hydrolysis and saponification. This reduces substantially the α-tocopherol yield because α-tocopherol is extremely labile under basic pH conditions in the presence of alkali and the like. Some processes result in substantial concentrations of sterol esters in both the tocopherols products and sterols products obtained thereby. Consequently, there is a need for improvement in the treatment of deodorizer sludge and the like to obtain therefrom tocopherols and sterols.

An object of this invention is to provide a new process for separating tocopherols and sterols from deodorizer sludge and the like.

This object and others are achieved by this invention which is based on the discovery that if deodorizer sludge is first reacted in an acid environment with a lower monohydric alcohol to convert free fatty acids in the sludge to lower monohydric alcohol esters, and the thus treated sludge is then subjected to fractional liquid-liquid extraction with a polar liquid solvent and a nonpolar liquid solvent (which is substantially immiscible with the polar solvent) at a high enough volumetric ratio of polar solvent to nonpolar solvent, there is obtained a polar solvent solution which is rich in sterols and tocopherols but poor in lower monohydric alcohol esters, sterol esters and triglycerides, and a nonpolar solvent solution immiscible with said polar solvent solution and poor in sterols and tocopherols but rich in lower monohydric alcohol esters, sterol esters and triglycerides.

In summary, this invention broadly comprises a process for separating sterols and tocopherols from deodorizer sludge and the like, which comprises: (1) treating deodorizer sludge under strongly acid conditions with at least one lower monohydric alcohol to convert higher fatty acids into lower monohydric alcohol esters; and (2) effecting fractional, liquid-liquid extraction of the thus treated sludge with a polar liquid solvent and a nonpolar liquid solvent, the volumetric ratio of the polar liquid solvent to the nonpolar liquid solvent being selected to result in more of the tocopherols and sterols present in the treated sludge being dissolved by the polar liquid solvent than by the nonpolar liquid solvent. There is thereby obtained a polar liquid solution or extract fraction rich in tocopherols and sterols but poor in lower monohydric alcohol esters, sterol esters and triglycerides. In addition there is thereby obtained a nonpolar liquid solution or raffinate fraction substantially immiscible with the polar liquid solution and poor in tocopherols and sterols but rich in lower monohydric alcohol esters, sterol esters and triglycerides.

The first step of the process of this invention is performed preferably by refluxing the deodorizer sludge with an acid and at least one lower monohydric alcohol for a period of time sufficient to effect substantially complete esterification of the higher fatty acids. A preferred acid is a mineral acid. The acid and acid concentration should be such as to give to the deodorizer sludge a pH of less than about 1.5 and preferably a pH in a range from about 0.3 to about 1.5. At a pH in this preferred range complete esterification under reflux conditions occurs in about 1–2 hours. Concentrated hydrochloric acid at a concentration of about 5 parts by weight per 100 parts by weight of the mixture of deodorizer sludge and lower monohydric alcohol is particularly effective. The lower monohydric alcohol is an aliphatic monohydroxy alcohol having a carbon atom content generally in a range from 1 to about 6 carbon atoms and preferably in a range from about 1 to about 4 carbon atoms. A particularly effective lower alkyl alcohol is methanol. The total quantity of lower monohydric alcohol (either alone or as a mixture of lower monohydric alcohol) added to the deodorizer sludge is generally in stoichiometric excess compared to the free fatty acids content of the deodorizer sludge. Although the free fatty acids concentration varies from one batch of sludge to another and although the quantity of alcohol necessary for complete esterification of a fatty acid is dependent for the most part on the molecular weight of the alcohol, satisfactory results are generally obtained if the quantity of lower monohydric alcohol added to the deodorizer sludge is in a range from about 30 to about 60 parts by weight per 100 parts by weight of deodorizer sludge being treated.

The result of this first step of the process is a treated sludge comprising tocopherols, sterols, sterol esters, lower monohydric alcohol esters of highly fatty acids, triglycerides, diglycerides, monoglycerides, excess lower monohydric alcohol, water, hydrocarbons, acid catalyst and the like.

The second step of the process of this invention involves polar and nonpolar liquid selective solvents. The distinction between, and characteristics of, polar and nonpolar liquid solvents are well known in the art. In general, polar liquid solvents, such as water, methyl alcohol acetone and the like, are characterized by the presence in their molecules of hydroxyl groups or carbonyl groups associated with strong polarity, by high dielectric contsants which are evidence of such polarity and by water miscibility. In general, nonpolar liquid solvents such as benzene, hexane, carbon disulfide and the like are characterized by weakly polar molecular structures and, accordingly, have low dielectric constants. A chief characteristic of polar and nonpolar liquid solvents is the general immiscibility of polar liquid solvents with nonpolar liquid solvents. Partial miscibility frequently does exist, depending upon how strongly polar or nonpolar the two solvents are. However, under the concepts of this invention there must be sufficient immiscibility not only of the solvents but of the solutions formed after admixture of the solvents with the sludge to result in two liquid phases. Each solvent under the concepts of this invention can be a single liquid or a miscible mixture of liquids as long as the immiscibility conditions exists.

In accordance with this invention the nonpolar solvent must dissolve sterol esters, triglycerides and lower monohydric alcohol esters of fatty acids while the polar solvent must dissolve at least to a limited extent sterols and tocopherols. As a practical matter polar solvents and nonpolar solvents are usually selective only with respect to hydrocarbons, sterol esters and triglycerides; generally speaking, sterols, tocopherols, monoglycerides, diglycerides and lower monohydric alcohol esters are soluble to various extends in both polar solvents and nonpolar solvents. Because of this fact, solvent ratio has an important part in this invention. The solvent ratio, that is to say, the volume ratio of polar liquid solvent to nonpolar liquid solvent, is selected so that upon admixture of the solvents with treated sludge more of the tocopherols and sterols are dissolved by the polar liquid solvent than by the nonpolar liquid solvent. This condition is satisfied by a rather broad range of solvent ratios. In this regard, this condition is dependent on a number of variables including the solvents involved, temperature, treated sludge composition, etc. However, the optimum solvent ratio can be approximated from the equation $$R = \frac{1}{\sqrt{C_T \times C_E}}$$

wherein $R$ is solvent ratio (volumetric basis), $C_T$ is the distribution coefficient of the tocopherols in the solvent system or combination to be employed at the intended temperature of extraction and $C_E$ is the distribution coefficient (or partition ratio) of the lower monohydric alcohol esters of higher fatty acids in the solvent combination to be employed at the intended temperature of extraction. $C_T$ and $C_E$ are determined by application of the following equations:

$$C_T = \frac{W}{W'}$$

wherein $W$ stands for grams of tocopherols per 100 milliliters of polar liquid solution and $W'$ stands for grams of tocopherols per 100 milliliters of nonpolar liquid solution, and $$C_E = \frac{G}{G'}$$

wherein $G$ stands for grams of lower monohydric alcohol esters per 100 milliliters of polar liquid solution and $G'$ stands for grams of lower monohydric alcohol esters per 100 milliliters of nonpolar liquid solution. The quantities for the tocopherols equation can be determined by taking a 1 gram sample of tocopherols approximating the tocopherols composition of the treated sludge, admixing the sample with 100 milliliters of each solvent to be employed, separating the resulting phases, measuring the volume of each phase, removing the solvents, in each case weighing the tocopherols, and then calculating for each case the weight of tocopherols per 100 milliliters of solution. The quantities for the esters equation can be determined by taking a 1 gram sample of esters approximating the lower monohydric alcohol esters composition of the treated sludge, admixing the sample with 100 milliliters of each solvent to be employed, separating the resulting phases, measuring the volume of each phase, removing the solvents, in each case weighing the esters, and then calculating for each case the weight of tocopherols per 100 milliliters of solution.

Examples of polar solvent-nonpolar solvent combinations or pairs under the concepts of this invention are (the percentages given being by volume):

| Polar Liquid Solvent | Nonpolar Liquid Solvent | Temp., °C. | Preferred Solvent Ratio Range | Preferred Solvent Ratio |
|---|---|---|---|---|
| 1. Methanol (98%)+Water (2%). | Hexane | 20 | 2.2–3.3 | 2.9 |
| 2. Ethanol (83%)+Water (17%). | ___do___ | 25 | 1.8–2.3 | 2 |
| 3. Acetonitrile (80%)+Methanol (20%). | Isoheptane | 45 | 3.3–4.5 | 4 |
| 4. Dimethylformamide | Hexane | 4 | 2.3–3.0 | 2.7 |
| 5. Furfural | ___do___ | 20 | 2.5–3.1 | 2.8 |
| 6. Dimethylsulfoxide | ___do___ | 25 | 10–14 | 12.4 |
| 7. Acetonitrile | n-Heptane | 20 | 7–9 | 8.2 |

These are optimum, solvent pairs for treated sludge with the ratio of sludge in grams to total solvents in milliliters being about 1:10. Thus, in the case of the methanol+water polar solvent and hexane nonpolar solvent, about 0.5% by volume of the polar solvent is the minimum water concentration needed to obtain a two-phase system. The concentration of water can be as high as about 5% by volume of the polar solvent without adversely affecting the relative distribution coefficient of the tocopherols and the lower monohydric alcohol esters (in a preferred embodiment of this invention, these are methyl alcohol esters). If the water concentration of this polar solvent is in excess of about 5% by volume, the distribution coefficients are so small as to require an inordinately high ratio of polar solvent to nonpolar solvent in this particular solvent pair. On the other hand, in this methanol+water solvent and hexane solvent pair, if the water content of the polar solvent is too low, the density difference between the two phases becomes so small, due to mutual solubility, as to make phase separation too slow to be practical. Hence, a water concentration of 2% by volume of the polar solvent (mixture of methanol and water) has been found to be a practical compromise. Incidentally, temperature has an effect on density difference between the two phases. One way of effectively increasing the density difference between the two phases without substantially adversely affecting the distribution coefficients is by an increase in the temperature. Thus, in the case of the solvent pair dimethylformamide and hexane, 4° C. is an optimum temperature while in the case of acetonitrile (80%) methanol (20%) and isoheptane, 45° C. is an optimum temperature.

Other solvent pairs can be employed under the concepts of this invention. For example, there is the pair composed of the polar solvent:ethanol (73% by volume)+ethanolamine (27% by volume) and of the nonpolar solvent:n-heptane. As another example, there is the pair composed of the polar solvent:ethylene glycol monoethyl ether (75% by volume)+ethylene glycol (25% by volume), and of the nonpolar solvent:n-heptane. However, it is preferred that the polar liquid solvent comprise at least one lower monohydric alcohol and especially the particular lower monohydric alcohol or alcohols employed in the first step of the process of this invention to esterify the free higher fatty acids. The reason for this preference is to provide an environment at all times in both phases (both polar and nonpolar liquid solvents have a degree of mutual solubility) adverse to esterification of the sterols by interaction between the sterols and the various esters that are present.

Not only must the polar solvent and nonpolar solvent result in two immiscible phases, but such phases under the process conditions of this invention must not form stable emulsions. Stated another way, the two phases must be rapid breaking; phase separation must take place at a practical rate. In some instances, in order to meet this requirement, an emulsion breaker, preferably an edible, non-toxic compound or composition, can be added to one of the liquid solvents and preferably the polar solvent.

The second step of the process of this invention in its broader aspects is preferably performed by intimately admixing the treated sludge, the polar liquid solvent and the nonpolar liquid solvent, whereby a two phase mixture results, and then separating one phase from the other. Considering the two phase mixture as a whole, the treated sludge concentration thereof is generally in a range from about 1 to about 15 grams per 100 milliliters of both solvents together, the preferred concentration being about 10 grams per 100 milliliters of both solvents together. The two phase mixture comprises a polar liquid solution and a nonpolar liquid solution or raffinate fraction. Under the concepts of this invention the two fractions are immiscible and do not form stable emulsions under the prevailing process conditions. Hence, after admixture has been completed coalescence of phases and phase separation takes place. The phases are removed from one another as by decantation, centrifugation and the like, giving a polar liquid solution and a nonpolar liquid solution. The polar liquid solution or extract fraction is rich in sterols and tocopherols, and poor in lower monohydric alcohol esters of higher fatty acids, triglycerides, sludge, hydrocarbons, sterol esters and the like. On the other hand, the nonpolar liquid solution or raffinate fraction is poor in sterols and tocopherols and rich in lower monohydric alcohol esters of higher fatty acids, triglycerides, sludge, hydrocarbons, sterol esters and the like.

In the more specific and preferred aspects of this invention, this second step is performed by a countercurrent procedure as on a stage-wise basis [such as in the apparatus described by Scheibel, Ind. and Eng. Chem., 49, 1679–1684, particularly 1681–1683 (October 1957)] or on a continuous basis in an extracted column such as one of those described in Chemical Engineers' Handbook, Perry, 3d ed., 747–753 (1950). A preferred extraction column type apparatus for this step is that described in "Technique of Organic Chemistry, vol. III, Separation and Purification," 2nd complete revised and augmented edition, Interscience Publishers, Inc., 376–386 (particularly shown on page 377) (1956). The number of extraction stages (theoretical or actual stages of admixing and separating) is selected to give an extract fraction as rich as practical in tocopherols and sterols but as poor as practical in sterol esters, triglycerides and lower monohydric alcohol esters of higher fatty acids, and a raffinate fraction as poor as practical in tocopherols and sterols but as rich as practical in sterol esters, triglycerides and lower monohydric alcohol esters of higher fatty acids. The number of stages in general depends on the composition of the treated deodorizer sludge, the solvent ratio, solvent pair, the degree of purity sought in the sterols and tocopherols, the efficiency of extraction system and apparatus employed, etc. Hence, for a given treated deodorizer sludge a trial run usually has to be made in order to determine optimum conditions. This trial run can be accomplished according to either one of the examples which follow.

In the more specific aspects of this invention this process comprises the additional step of separating the polar liquid solution or extract fraction into a sterols product and a tocopherols concentrate.

This can be accomplished by concentrating the solution (as by evaporation of the polar solvent) to the point of incipient precipitation (crystallization) of sterols (in the case of methanol-water this is at a methanol-water concentration of about 5–10% by weight at 20° C.) and then establishing and maintaining for a suitable period of time the concentrated solution at a temperature in a range from about −20 to about 20° C., whereby crystallization of sterols takes place, and then separating as by filtration the crystalline sterols from the mother liquor. The time and temperature selected for crystallization depend on the extent of sterols removal desired. In general, however, a time of about 24 hours and a temperature of about 4° C. results in a practical maximum removal of sterols.

It also can be accomplished, and preferably is, by substantially completely removing as by vacuum distillation the polar liquid solvent from the solution, dissolving the sterols and tocopherols in a dry polar solvent, preferably methanol although acetone is suitable, and then establishing and maintaining for 24 hours the resulting solution at a temperature of about 4° C. The resulting crystallized sterols are separated as by filtration from the mother liquor.

In either procedure the mother liquor, which is the tocopherols product, is then further concentrated, if desired, by distilling off the solvent and water washed to remove therefrom water soluble impurities such as the mineral acid carried over from the initial sludge treatment step of the process.

It has been observed that in the fractional extraction step the relative distribution of tocopherols and sterols and of lower monohydric alcohol esters of higher fatty acids is more favorable in the case of those esters wherein the higher fatty acids are saturated than when they are mainly unsaturated. Hence, this process gives particularly good results when the deodorizer sludge is derived from saturated vegetable oils including those which have been hydrogenated. It is also within the concepts of this invention to precede the extraction step of this invention with a hydrogenation step in those cases where the deodorizer sludge has a substantial, unsaturated, higher fatty acid moieties content. When a hydrogenation step is employed, it preferably is carried out prior to treating the sludge to esterify the free, higher fatty acids therein.

To further increase the purity of the tocopherols product and sterols product of the process of this invention, particularly in those instances where the deodorizer sludge has a high concentration of monoglyceride (higher fatty acid monoesters of glycol) which are relatively polar in nature, and to increase the yield of sterols particularly when the deodorizer sludge is low in free sterols but high in sterol esters the acid concentration in the higher fatty acid esterification step can be increased to a pH as much as 0.1 and/or a long enough reflux time can be employed to effect substantially complete hydrolysis of the monoglycerides to glycerine and hydrolysis of the sterol esters to sterols. In such case, the lower monohydric alcohol concentration is increased to assure stoichiometric excess as well as to effect total esterification of all of the higher fatty acids initially present in the deodorizer sludge as well as those formed by hydrolysis. The thus treated sludge, without removal of excess lower monohydric alcohol, is then fractionally extracted according to the second step of the process.

These concepts are illustrated in detail by the following examples of various aspects of the invention including specific embodiments thereof. This invention is not limited to these specific embodiments unless otherwise indicated. In the examples all parts and percentages are by weight except as otherwise designated.

Example 1

This example illustrates the practice of a specific embodiment of the process of this invention.

Reflux together for 1 hour 350 parts of a typical deodorizer sludge derived from soybean oil, 152 parts of methanol and 25 parts of concentrated hydrochloric acid. Cool the thus treated sludge to 20° C. At this point in order to demonstrate the efficacy of the extraction step of the process, take a small sample of the treated sludge and analyze for total tocopherols by the Emmerie-Engel assay and for the other components by infrared analysis. A typical analysis of a sample of this treated sludge is: total tocopherols=98 milligrams per gram of treated sludge; free sterols=8%; sterol esters=13.5%; monoglycerides=3%; diglycerides=10%; triglycerides=5%; and methyl esters of higher fatty acids=35%.

Set up a 13 stage cascade of separatory funnels and, following the procedure described in the previously mentioned Scheibel article, countercurrently extract therein the treated deodorizer sludge with the polar solvent: methanol (98%)+water (2%) and the nonpolar solvent:hexane. In developing the extraction pattern introduce the treated deodorizer sludge in portions of 15 parts each to the center stage of the cascade, hexane in portions of 132 parts each into one end stage of the cascade, the extract fraction end stage, and the polar solvent in portions of 400 parts each into the other end stage of the cascade, which end stage is the raffinate fraction end stage. The ratio of treated sludge to total solvent introduced each time is equivalent to 2 grams of treated sludge per 100 milliliters of total solvent. As the extraction pattern develops, withdraw the extract fraction (heavy phase) and raffinate fraction (light phase) appearing each time in the respective end stages. When steady state conditions have been substantially achieved in each stage of the cascade the extract fractions then obtained are rich in tocopherols and sterols, and poor in sterol esters, methyl esters and triglycerides.

A typical analysis of a steady state extract fraction obtained by this procedure under these conditions shows 3.62 parts of oil having by Emmerie-Engel assay a total tocopherols content=322 milligrams per gram of oil (representing a yield of 79.5%) and by infrared assay: free sterols=26% (representing a yield of 78%); sterol esters=0%; monoglycerides=12%; diglycerides=16%; triglycerides=0%; and methyl esters of higher fatty acids=5%.

A typical analysis of a steady stage raffinate fraction batch obtained by this procedure under these conditions shows 10.4 parts of oil having by Emmerie-Engel assay a total tocopherols content=31 milligrams per gram of oil, and by infrared assay: free sterols=1.5%; sterol esters=19.5%; monoglycerides=0%; diglycerides=7.5%; triglycerides=7.2%; and methyl esters of higher fatty acids=48%.

Remove by vacuum distillation the methanol and water from a steady state extract fraction, whereby a sterols-tocopherols concentrate is obtained. Take up this concentrate in approximately two volumes of acetone, winter overnight at −20° C. and then filter. The filter cake is the sterols product while the mother liquor is a tocopherols concentrate.

A typical analysis of the tocopherols concentrate shows an Emmerie-Engel assay of total tocopherols of 409 milligrams per gram. A typical analysis of the sterols product shows 73% free sterols, 10% monoglycerides, no sterol esters and a small percentage of residual fatty acids not esterified in the first step of the process.

Example 2

This example illustrates the practice of another specific embodiment of the process of this invention.

Reflux together for 1 hour 1050 parts of a typical deodorizer sludge derived from soybean oil, 456 parts of methanol and 75 parts of concentrated hydrochloric acid. Cool the thus treated sludge to 20° C. At this point take a small sample of the treated sludge and analyze. A typical analysis is: total tocopherols by the Emmerie-Engel assay=109 milligrams per gram of treated sludge; free sterols by infrared analysis=8%; and sterol esters by infrared analysis=14%.

Admix the treated sludge with an equal volume of hexane. Introduce the thus diluted, treated sludge at a rate of 5.4 parts by weight per minute into the infeed port at the center of a 2 inch internal diameter, unpacked vertically disposed extraction column having at the top end a raffinate fraction outlet, in the region of the top end, a heavy liquid solvent inlet, at the bottom end an extract fraction outlet and in the region of the bottom end a light liquid solvent inlet, equipped with a longitudinal mixer and in length and effect equivalent to about 7 theoretical extraction stages. With the mixer in operation, introduce the heavy polar liquid solvent of methanol (98%) and water (2%) at a rate of 64 parts per minute into the heavy liquid inlet of the column and introduce the light nonpolar liquid solvent hexane at a rate of 17.5 parts per minute into the light liquid inlet of the column. Considering the hexane portion of the diluted, treated sludge as part of the nonpolar solvent introduced into the extraction column, the ratio of undiluted, treated sludge to total solvent introduced per minute into the extraction column is equivalent to 2.9 grams of treated sludge per 100 milliliters of both solvents together. While introducing treated sludge and solvents at the specified rates into the extraction column, continuously withdraw extract fraction at a rate of about 65.1 parts per minute from the extract fraction outlet and raffinate fraction at a rate of about 21.7 parts per minute from the raffinate fraction outlet. Run the column under these conditions for about 3 hours in order to achieve a steady state operation. Under steady state operation conditions an extract fraction is obtained which is rich in tocopherols and sterols and poor in sterol esters, while a raffinate fraction is obtained which is poor in tocopherols and sterols and rich in sterol esters.

A typical analysis of an extract fraction collected over 5½ hours of steady state operation according to this procedure and under these conditions (in this period a total of 1023 parts of undiluted treated sludge is extracted) is 368 parts of oil having a total tocopherols content by Emmerie-Engel assay of 210 milligrams per gram of oil (representing a yield of 69%), no measurable content of sterol esters, free sterols by infrared analysis of 18% (representing a yield of 80.5%) and methyl esters of 36%.

A typical analysis of a raffinate fraction collected at the same time as the foregoing extract fraction is 630 parts of oil having a total tocopherols content by Emmerie-Engel assay of 48 milligrams per gram of oil (representing a yield of 27%), a sterol esters content by infrared assay of 23% (representing a yield of 100%), free sterols by infrared analysis of 3% (representing a yield of 23%) and methyl esters of 61%.

To obtain a sterols product and a tocopherols concentrate, evaporate the methanol from the extract fraction until the volume has been reduced to about ⅔ the initial volume. Cool the thus concentrated extract fraction to 4° C. and let stand overnight, whereby the sterols are crystallized. Filter the crystallized sterols from the mother liquor. The filter cake is the sterols product which can be further purified if desired. The mother liquor is the tocopherols concentrate which also can be further purified if desired. A typical analysis of the sterols product shows 84% free sterols, 8% non-steroid esters and a concentration less than about 8% of free fatty acids. A typical analysis of the tocopherols concentrate shows a total tocopherols content by Emmerie-Engel assay of 240 milligrams per gram of concentrate and a free sterols content of 1.5%.

These purities and yields can be increased by increasing the number of theoretical stages of the extraction column.

Thus, there is provided a new process for separating tocopherols and sterols from deodorizer sluge and the like.

A feature of advantage of the process of this invention is the decrease in sterol esters concentration of the sterols-tocopherols product separated from deodorizer sludge and the like.

Thus, there is provided a process capable of obtaining a cleaner separation of tocopherols and sterols from deodorizer sludge and the like by virtue of the fact that a physical method dependent on polarity is employed rather than one (distillation) characterized by molecular weight. In this regard, it is a discovery of this invention that many of the impurities occurring with tocopherols and sterols in deodorizer sludge treated to esterify the fatty acids therein have similar molecular weights but widely different polarities.

An advantage of the process of this invention is that it in all its aspects can be practiced on a continuous basis.

These and other advantages, benefits and specific embodiments of this invention will be readily apparent to those in exercise of ordinary skill in the art upon reading the foregoing disclosure. In this regard, while this invention has been described in considerable detail relative to specific embodiments thereof, variations and modifications of these specific embodiments are possible without departing from the spirit and essential characteristics of this invention as defined by the claims which follow.

The embodiments of this invention in which an exclusive property or privilege is claimed are defined as follows:

1. A process for separating tocopherols and sterols from a mixture consisting essentially of tocopherols, sterols, sterol esters, triglycerides and lower monohydric alcohol esters of higher fatty acids, which comprises: effecting fractional, liquid-liquid extraction of said mixture with a polar liquid solvent and a nonpolar liquid solvent, the volumetric ratio of the polar liquid solvent to the nonpolar liquid solvent being selected to result in more of the tocopherols and sterols in the mixture being dissolved by the polar liquid solvent than by the nonpolar liquid solvent, whereby there is obtained a polar liquid solution rich in tocopherols and sterols but poor in lower monohydric alcohol esters, sterol esters and triglycerides, and a nonpolar liquid solution that is immiscible with said polar liquid solution and poor in tocopherols and sterols but rich in sterol esters, triglycerides and lower monohydric alcohol esters of higher fatty acids.

2. A process for separating tocopherols and sterols from a deodorizer sludge, which comprises: (1) refluxing said sludge, a catalytic quantity of hydrochloric acid and methanol in stoichiometric excess relative to the higher fatty acids content of said sludge, whereby higher fatty acids in said sludge are esterified by said methanol and a treated sludge is formed; (2) fractionally extracting counter currently said treated sludge with the polar solvent hexane and the nonpolar solvent consisting of methanol plus water, the relative concentration of said methanol being in a range from about 95 to about 99.5% by volume and the relative concentration of said water being in a range from about 0.5 to about 5% by volume, the volumetric ratio of polar solvent to nonpolar solvent being in a range from about 2.2 to about 3.3 and the ratio of said treated sludge to total solvents being equivalent to a ratio in a range from about 1 to about 5 grams per 100 milliliters of total solvents, whereby there are obtained an extract fraction containing methanol plus water and rich in tocopherols and sterols but poor in sterol esters, triglycerides and methanol esters of higher fatty acids, and a raffinate fraction containing hexane, and poor in tocopherols and sterols but rich in sterol esters, triglycerides and methanol esters of higher fatty acids; and (3) removing methanol and water from said extract fraction to the point of incipient crystallization of sterols, forming thereby a sterols-tocopherols concentrate; (4) establishing and maintaining said sterols-tocopherols concentrate at a temperature in a range from about 0 to about 20° C. until crystallization of sterols is substantially complete; and (5) separating from said concentrate crystalline sterols, whereby there is obtained a solid sterols product and a liquid tocopherols concentrate.

3. A process for separating tocopherols and sterols from a deodorizer sludge having a highly unsaturated, higher fatty acid moieties content, which comprises: (1) hydrogenating said sludge until said highly unsaturated, higher fatty acid moieties content becomes substantially chemically saturated; (2) effecting under acid conditions esterification of higher fatty acids in said hydrogenated sludge by at least one lower monohydric alcohol, whereby a treated sludge is obtained; and (3) fractionally extracting said treated sludge with a polar liquid solvent and a nonpolar liquid solvent, the volumetric ratio of the polar liquid solvent to the nonpolar liquid solvent being selected to result in more of the tocopherols and sterols in the mixture being dissolved by the polar liquid solvent than by the nonpolar liquid solvent, whereby there is obtained a polar liquid solution rich in tocopherols and sterols but poor in lower monohydric alcohol esters, sterol esters and triglycerides, and a nonpolar liquid solution that is immiscible with said polar liquid solution and poor in tocopherols and sterols but rich in sterol esters, triglycerides and lower monohydric alcohol esters of higher fatty acids.

4. A process for separating tocopherols and sterols from a deodorizer sludge, which comprises: (1) effecting with the aid of an acid catalyst hydrolysis of monoglycerides in said sludge and esterification by at least one lower monohydric alcohol of higher fatty acids initially in said sludge as well as those formed by hydrolysis, whereby a treated sludge is obtained; and (2) fractionally extracting said treated sludge with a polar liquid solvent and a nonpolar liquid solvent, the volumetric ratio of the polar liquid solvent to the nonpolar liquid solvent being selected to result in more of the tocopherols and sterols in the mixture being dissolved by the polar liquid solvent than by the nonpolar liquid solvent, whereby there is obtained a polar liquid solution rich in tocopherols and sterols but poor in lower monohydric alcohol esters, sterol esters and triglycerides, and a nonpolar liquid solution that is immiscible with said polar liquid solution and poor in tocopherols and sterols but rich in sterol esters, triglycerides and lower monohydric alcohol esters of higher fatty acids.

5. A process for separating tocopherols and sterols from a deodorizer sludge, which comprises: (1) effecting under acid conditions esterification of higher fatty acids in said sludge by at least one lower monohydric alcohol, whereby a treated sludge is obtained; and (2) fractionally extracting said treated sludge with a polar liquid solvent and a nonpolar liquid solvent, said polar liquid solvent comprising at least one lower monohydric alcohol, the volumetric ratio of the polar liquid solvent to the nonpolar liquid solvent being selected to result in more of the tocopherols and sterols in the mixture being dissolved by the polar liquid solvent than by the nonpolar liquid solvent, whereby there is obtained a polar liquid solution rich in tocopherols and sterols but poor in lower monohydric alcohol esters, sterol esters and triglycerides, and a nonpolar liquid solution that is immiscible with said polar liquid solution and poor in tocopherols and sterols but rich in sterol esters, triglycerides and lower monohydric alcohol esters of higher fatty acids.

(References on following page)

References Cited in the file of this patent

UNITED STATES PATENTS

| | | |
|---|---|---|
| 2,321,928 | McFarlane | June 15, 1943 |
| 2,349,275 | Hickman | May 23, 1944 |
| 2,379,420 | Baxter et al. | July 3, 1945 |
| 2,412,766 | Buxton | Dec. 17, 1946 |
| 2,454,692 | Embree et al. | Nov. 23, 1948 |
| 2,499,778 | Quayle | Mar. 7 1950 |
| 2,508,387 | Hixson et al. | May 23, 1950 |
| 2,679,503 | Christenson | May 25, 1954 |
| 2,905,677 | Fevig et al. | Sept. 22, 1959 |

FOREIGN PATENTS

| | | |
|---|---|---|
| 480,483 | Canada | Jan. 22, 1952 |

OTHER REFERENCES

Weissberger: Technique of Organic Chemistry, vol. III, Part I (Separation and Purification), pages 332–393, Interscience Publ. Inc., New York (1956).